(12) United States Patent
Krebs et al.

(10) Patent No.: US 8,343,421 B2
(45) Date of Patent: Jan. 1, 2013

(54) METHOD AND SYSTEM FOR ENHANCED HIGH INTENSITY ACOUSTIC WAVES APPLICATION

(75) Inventors: Niels Krebs, Hellerup (DK); Carsten Langkjaer, Vaerlose (DK)

(73) Assignee: Force Technology, Brondby (DK)

( * ) Notice: Subject to any disclaimer, the term of this patent is extended or adjusted under 35 U.S.C. 154(b) by 592 days.

(21) Appl. No.: 12/309,088

(22) PCT Filed: Jul. 6, 2007

(86) PCT No.: PCT/DK2007/000346
§ 371 (c)(1),
(2), (4) Date: Jan. 6, 2009

(87) PCT Pub. No.: WO2008/003324
PCT Pub. Date: Jan. 10, 2008

(65) Prior Publication Data
US 2009/0288910 A1 Nov. 26, 2009

(30) Foreign Application Priority Data
Jul. 7, 2006 (DK) .............................. 2006 00935

(51) Int. Cl.
*A61L 9/00* (2006.01)
*A61L 2/00* (2006.01)
*B06B 1/00* (2006.01)
*A62C 5/02* (2006.01)
*F15C 1/04* (2006.01)

(52) U.S. Cl. .................... 422/26; 422/1; 422/4; 422/20; 422/27; 422/28; 422/128; 239/8; 239/102.2; 137/831

(58) Field of Classification Search .................. 422/1, 4, 422/20, 26–28, 128, 292, 305–306; 239/8, 239/102.2; 137/831
See application file for complete search history.

(56) References Cited

U.S. PATENT DOCUMENTS

| | | | |
|---|---|---|---|
| 3,169,507 A | | 2/1965 | Stanley |
| 3,731,877 A | * | 5/1973 | Nekrasov et al. ............. 239/266 |
| 4,396,434 A | | 8/1983 | Forster |
| 6,233,844 B1 | | 5/2001 | Gallego Juarez et al. |
| 2004/0005240 A1 | * | 1/2004 | Adiga et al. ...................... 422/1 |
| 2004/0094183 A1 | | 5/2004 | Ching et al. |
| 2008/0289971 A1 | | 11/2008 | Shigihara et al. |

FOREIGN PATENT DOCUMENTS

| | | |
|---|---|---|
| WO | WO 02/078751 | 10/2002 |
| WO | WO 2006/001293 | 1/2006 |

* cited by examiner

*Primary Examiner* — Jill Warden
*Assistant Examiner* — Monzer Chorbaji
(74) *Attorney, Agent, or Firm* — Morrison & Foerster LLP

(57) ABSTRACT

According to the invention a method (and corresponding system) of enhancing application of high intensity acoustic waves is provided, wherein acoustic waves, e.g. ultrasound, and a gaseous medium, e.g. steam, coincide at a treatment zone. This is achieved by a combination of one or more high intensity acoustic generators and/or reflectors. In this way, enhanced efficiency in an area of the gaseous medium (or where the gaseous medium is to affect something) is obtained since a second generator or a reflector is located so that the acoustic waves directly influence the gaseous medium.

13 Claims, 6 Drawing Sheets

METHOD AND SYSTEM FOR ENHANCED HIGH INTENSITY ACOUSTIC WAVES APPLICATION

FIELD OF THE INVENTION

The invention relates generally to the application of high intensity acoustic waves to one or more objects or items or particles. The invention more specifically relates to a method of enhancing and a system for enhanced application of high intensity acoustic waves of sonic (i.e. audible sound) or ultrasonic frequencies.

BACKGROUND OF THE INVENTION

High intensive acoustic waves (sound and/or ultrasound) in gases lead to very high velocities and displacements of the gas molecules. As an example, a sound pressure level (SPL) of 160 dB (at approximately 10 cm from the orifice of the generator) corresponds to a particle velocity of 4.5 m/s and a displacement of 33 μm at 22.000 Hz. In other words, the application of high intensity acoustic waves increases the kinetic energy of the gas molecules significantly.

The large displacements and high kinetic energy of the gas molecules in a gaseous medium due to the application of high intensity acoustic waves will make the gas or air around a solid object oscillate with a high amount of energy. When the oscillating gas or air interacts with a solid object or particles then processes like heat transfer and/or mass transport is enhanced.

Certain high intensity acoustic wave generators use pressurized steam or air or another type of a gaseous medium to generate high intensity acoustic waves. One example is e.g. the ultrasound generator disclosed in European patent EP 1381399 by the same applicant. In this generator, a supercritical (i.e. supersonic) jet stream of steam shoots out from a nozzle and slows down in a resonator producing ultrasound. Generators whose principle of operation is based on auto-oscillations of the supersonic stream when braking in a resonator are referred to as Hartmann generators or to be working according to the well-known Hartmann's Principle. There are different types of the Hartmann generators (e.g. classical, stem-jet, disk-jet, and slot-jet, as well as Laval-nozzle Hartmann generators). Another type of high intensity acoustic wave generator using a pressurized gaseous medium (i.e. gas-jet generators) is a Levavasseur whistle.

In these generators, the generated ultrasound and the gas propagates in a certain directions (that depends on the specific design of the generator) as will be discussed for a given generator in connection with FIG. 1.

A common property of such generators is that the gaseous stream and the acoustic waves are not coinciding.

Traditionally, uses of such acoustic devices have primarily involved using the generated acoustic waves for a given purpose while the gaseous medium was seen more as a by-product without any specific use.

In such traditional acoustic devices steam has not been used as a gaseous driving medium with a specific purpose until recently.

The recent use of a heated gaseous medium like heated steam in a Hartmann generator to generate the ultrasound also greatly enhances a disinfection process of food items as described in European patent EP 1381399 by the same applicant. EP 1381399 discloses the application of heated steam and ultrasound to efficiently kill germs or the like at a surface of a food item without causing damage to the food item. The pressurized steam is forced through an ultrasound generator generating ultrasound in the process. The steam is directed at the food item and the ultrasound enhances the disinfection process by supplying energy.

As indicated and explained in greater detail in FIG. 1, in such various types (Classical, Stem-jet, Disk-jet, Slot-jet, Laval-nozzle etc.) of Hartmann generators, Levavasseur whistles, etc., the gaseous medium may have a general direction indicated by the arrow labeled (A), that is generally directed towards the object to be treated or affected with the gaseous medium while the generated ultrasound may have a general direction indicated by the two arrows labeled (B) that is different than the general direction of the gaseous medium (A). During use, at least a part of the generated ultrasound should be reflected to coincide with at least a part of the gaseous medium after exit from the sound generator in order to benefit from the ultrasound before or at substantially the same time as the steam reaches a treatment or affection zone or region of an object to be affected or treated. The reflection can e.g. be provided by placing reflectors, walls, etc. at appropriate locations and/or simply by the design of the disinfection device.

However, the need for reflection of the ultrasound using conventional reflectors causes some loss in energy and thereby some loss in energy of the process. Furthermore, it is currently not simple how to design and where to place the reflectors needed or how to make the overall design of the disinfection device or ultrasound generator in order to ensure that ultrasound is brought in contact with the steam or gaseous medium at an appropriate reaction or treatment zone with sufficient or optimal energy.

OBJECT AND SUMMARY OF THE INVENTION

It is an object to provide a method (and a corresponding system) of enhanced application of high intensity acoustic waves where the method alleviates at least to some extent the above-mentioned shortcomings of the prior art.

It is a further object to provide efficient application of ultrasound in a simple way.

These objects are obtained to at least some extent by a method of enhancing application of high intensity acoustic waves, wherein the method comprises generating high intensity acoustic waves by a first acoustic wave generator using a gaseous medium where the gaseous medium, after exit from the acoustic wave generator, has a first general direction that is different from a second general direction of the high intensity acoustic waves generated by the first acoustic wave generator, generating high intensity acoustic waves by a second acoustic wave generator, where the first and second acoustic wave generators are located in relation to each other so that at least a part of the generated high intensity acoustic waves, being generated by said second acoustic wave generator, is directed towards at least a part of the gaseous medium after exit from said first acoustic wave generator.

In this way, enhanced efficiency in an area of the gaseous medium (or where the gaseous medium is to affect something) is obtained since the second generator is located so that it directly influences the gaseous medium from the first generator, e.g. before or at substantially the same time as the gaseous medium reaches a treatment or affection zone or region of one or more objects, items, particles, etc. to be affected or treated. This avoids or reduces the need for conventional reflectors or a specific design of a device comprising the acoustic wave generator that otherwise would be needed to direct or deflect the generated high intensity acoustic waves towards the gaseous medium. It should be noted that reflectors or the specific design may still be used to direct high intensity acoustic waves generated by the first generator so that it also influences the gaseous medium supplying additional energy (although not as efficiently using conventional reflectors as the high intensity acoustic waves generated by the second generator).

By conventional reflectors is to be understood reflectors typically used in connection with such gas driven acoustic wave generators.

In one embodiment, the gaseous medium is steam or super-heated steam or steam or super-heated steam mixed with air. In this way, efficient disinfection by the steam is obtained, e.g. usable on food items, etc.

Alternatively, the gaseous medium of said first and/or said second generator is selected from the group of ozone, ethylene oxide and its mixtures with hydrochlorofluorocarbons, alkali elements, hydroxides vapors, fluorine and chlorine as well as the gases based on them, like $CHF_3$, $CF_4$, $SF_6$, $BCl_3$, and their mixtures with pure oxygen and chlorine, a gaseous medium suitable for enhancing a catalytic process reacting on a solid object like a catalyst or another type of object, a cold gas or coolant, a hot gas and mixtures thereof.

In one embodiment, the high intensity acoustic waves generated by at least one high intensity acoustic wave generator are ultrasonic.

In one embodiment, the generated high intensity acoustic waves being generated by said second acoustic wave generator have a sound intensity selected from the group of: approximately 120 to approximately 160 dB, at least 120 dB, at least 140 dB, approximately 120 dB to approximately 160 dB, approximately 120 dB to approximately 140 dB, approximately 140 dB to approximately 160 dB, and approximately 160 dB or more. In this way, a very efficient transfer of energy to the gaseous medium is ensured.

In one embodiment, the second acoustic wave generator uses a gaseous medium to generate acoustic waves.

In one embodiment, the first and the second acoustic wave generator is of the same type.

In one embodiment, the gaseous medium of said first acoustic wave generator is steam or super-heated steam or steam or super-heated steam mixed with air and the gaseous medium of said second acoustic wave generator is air. In this way, the air of the second generator, if located appropriately, may hinder the steam of the first generator to disperse in one direction thereby keeping the steam longer or more efficiently within a given zone or area. This is e.g. useful when disinfecting items e.g. food items, as the items will be in contact with the steam for a longer period of time.

In one embodiment, the method comprises generating high intensity acoustic waves by a first group of four acoustic wave generators, where the four acoustic wave generators are located in relation to each other so that at least a part of the generated high intensity acoustic waves of each of the four wave generators is directed towards the gaseous medium of one of the other wave generators. In this way, a very efficient treatment zone or area is provided being subjected to the gaseous medium of the four generators and being supplied with the energy of acoustic waves of the four generators. One example of such an arrangement is shown in FIG. 11.

In one embodiment, the method comprises generating high intensity acoustic waves by four additional acoustic wave generators where at least a part of the generated high intensity acoustic waves is directed towards the gaseous medium of said first group of four acoustic wave generators, where the four additional acoustic wave generators use air to generate the high intensity acoustic waves where the air after exit from the additional acoustic wave generators hinders the gaseous medium of the first group of four acoustic wave generators from dispersing from a predetermined area. In this way, the gaseous medium is very efficiently hindered in dispersing. One example of such an arrangement is shown in FIG. 11.

In one embodiment, the first and/or the second high intensity acoustic wave generator comprises: an outer part and an inner part defining a passage, an opening, and a cavity provided in the inner part where said first and/or said second high intensity acoustic wave generator is adapted to receive a pressurized gaseous medium and pass the pressurized gaseous medium to said opening, from which the pressurized gaseous medium is discharged in a jet towards the cavity.

In one embodiment, a reflector is provided instead of a second high intensity acoustic wave generator where the reflector reflects (or deflects) the high intensity acoustic waves generated by the first acoustic wave generator towards at least a part of the gaseous medium after exit from said first acoustic wave generator and wherein said reflector has a generally parabolic or elliptical shape. In this way, a very efficient and focused direction of the generated acoustic waves towards the gaseous medium is provided without the need for a second acoustic wave generator for influencing the gaseous medium of the first generator (although a second or further acoustic wave generators still may be provided for other purposes or for additional influence of the gaseous medium of the first generator).

The present invention further relates to high intensity acoustic wave generator system for enhanced application of high intensity acoustic waves comprising a first acoustic wave generator for generating high intensity acoustic waves using a gaseous medium where the gaseous medium after exit from said first acoustic wave generator has a first general direction that is different from a second general direction of generated high intensity acoustic waves being generated by said first acoustic wave generator, and at least a second acoustic wave generator for generating high intensity acoustic waves, where said first and second acoustic wave generators are located in relation to each other so that at least a part of the generated high intensity acoustic waves, being generated by said second acoustic wave generator, is directed towards at least a part of the gaseous medium after exit from said first acoustic wave generator.

The system and embodiments thereof correspond to the method and embodiments thereof and have the same advantages for the same reasons. Advantageous embodiments of the system according to the present invention are defined in the sub-claims and described in detail in the following.

BRIEF DESCRIPTION OF THE DRAWINGS

These and other aspects of the invention will be apparent from and elucidated with reference to the illustrative embodiments shown in the drawings, in which.

DESCRIPTION OF PREFERRED EMBODIMENTS

Figure 1:
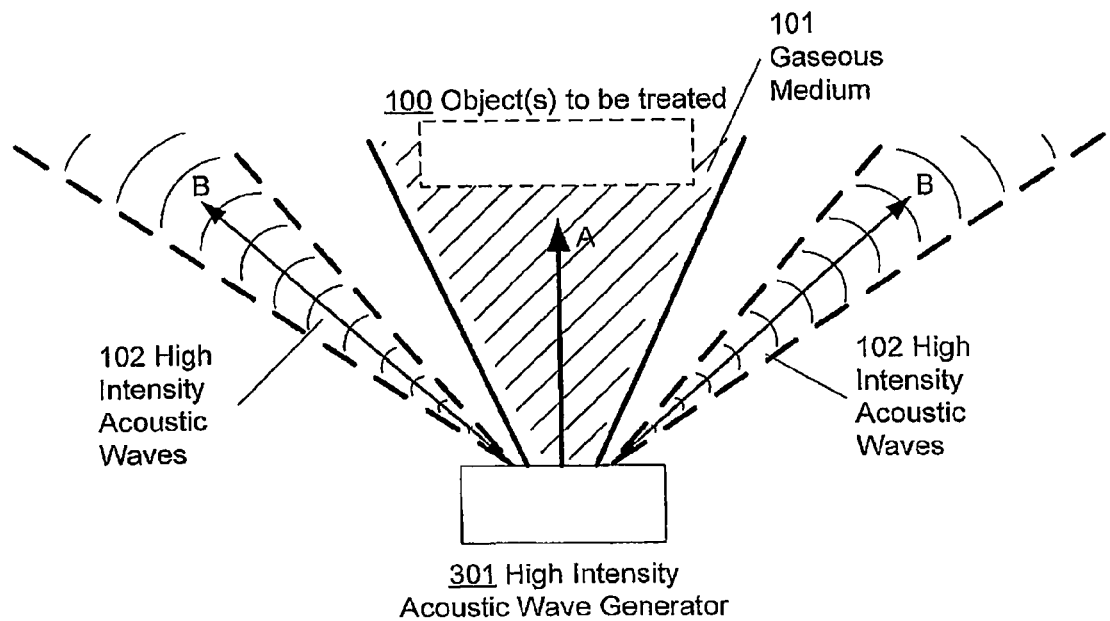
FIG. 1 schematically illustrates one example of a high intensity acoustic wave generator.

FIG. 1 schematically illustrates one example of a high intensity acoustic wave generator. Shown is an example of a jet stream high intensity acoustic wave generator (301), in this particular example an ultrasound generator, that generates high intensity acoustic waves (102), In this particular example in the form of ultrasound, using a gaseous medium (101), in this particular example steam. The steam (101) exits this particular device in a general direction schematically indicated by arrow (A) in a cone-like shape, as represented by the hatched area, towards one or more objects to be treated or affected by the steam (101). The steam (101) brings heat, especially if the steam is a super-heated stream, to the object (s) and/or particles to be treated (100) while the high intensity ultrasound (102) brings energy to the steam (101), when it contacts with the steam (101).

Figure 8:
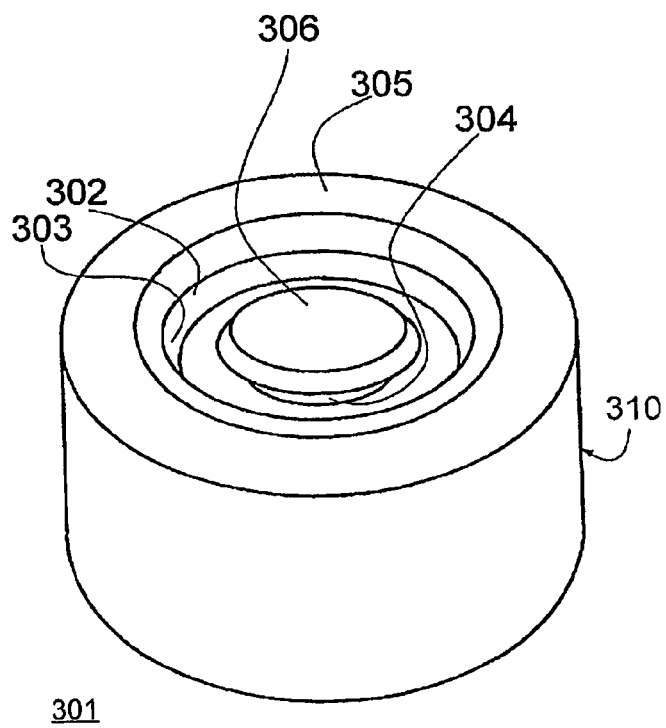
FIG. 8 schematically illustrates an embodiment of a high intensity acoustic wave generator in the form of a disk-shaped disk jet (i.e. a disk-jet Hartmann ultrasound generator)
Figure 9:
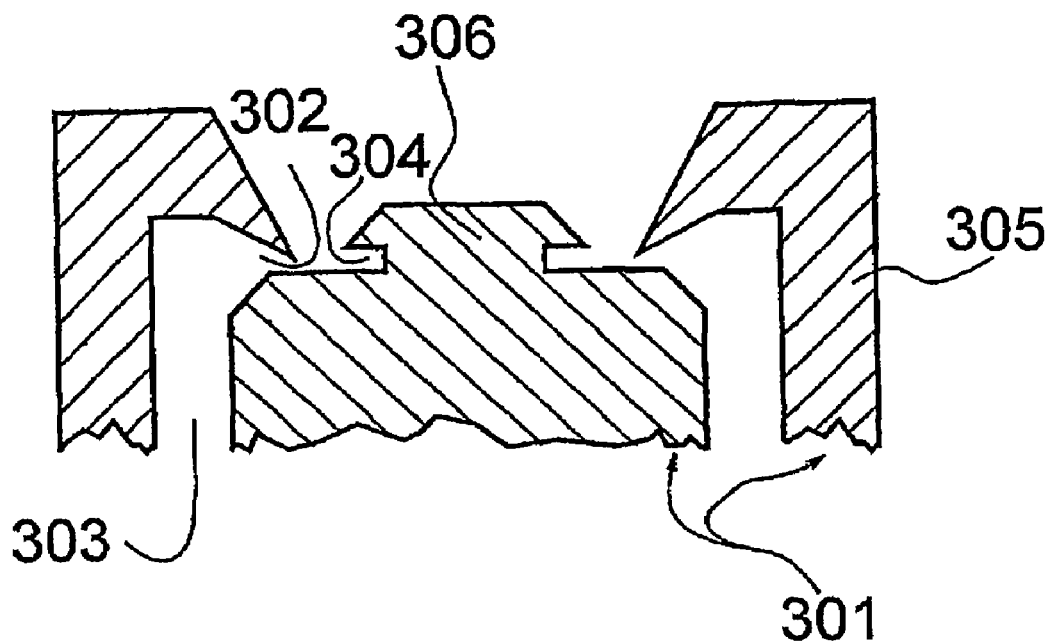
FIG. 9 is a sectional view along the diameter of the high intensity acoustic wave generator (301) In FIG. 8 illustrating the shape of an opening (302), a gas passage (303) and a cavity (304) more clearly.

The generated ultrasound (102) propagates In a general direction as schematically indicated by arrows (B) that is different than the general direction of the steam (A) due to the design of the acoustic wave generator (301) (see e.g. FIGS. 8 and 9 and related description. The difference in direction is due to the working principle and design of such various types of Hartmann generators, Levavasseur whistles, etc. and varies according to the physical properties of the steam (such as pressure, exit velocity, inlet velocity, etc.), the specific design of the generator (the various angles between parts used in the specific design; see e.g. FIGS. 8 and 9), etc. Other designs of generators or other used physical properties may cause the directions to be different from the ones showed and may also influence the size and/or extent of the generated ultrasound (102) and/or exit steam (101). Furthermore, the beginning of the generated ultrasound 'open cone' (102) (i.e. the end of the cone that is nearest to the generator (301)) may e.g. be placed nearer, overlapping or within the exit steam 'cone' (101). Alternatively, the ultrasound 'cones' (102) may be placed further apart from the exit steam 'cone' (101).

During use, at least a part of the generated ultrasound (102) should be reflected to coincide with at least a part of the steam (101) after exit from the acoustic wave generator (301) in order to benefit from the high intensity ultrasound (102) before or at substantially the same time as the steam reaches a treatment or affection zone or region of the object and/or particles to affected or treated (100). The reflection can e.g. be provided by placing specific reflectors at appropriate locations or by designing the steam applying device appropriately.

However, as mentioned the difference between the general directions of the ultrasound (B) and the general direction of the steam (A) causes a loss in efficiency of the treatment or affection by the steam on the object and/or particles (100) when using conventional reflectors, since reflection of the acoustic waves are required; and requires complicated design and fabrication.

It is to be understood that FIG. 1 (and other figures in the description) illustrates a sectional cut of a three-dimensional device. i.e. the steam cone (101) is a sectional cut of a three-dimensional steam cone and the ultrasound cones (102) are a sectional cut of three-dimensional propagating ultrasound that extends outwards from the generator (301) in a circular way (i.e. the cone (102) is present 360° around the generator (301) seen from above). Furthermore, the shown cones and shapes are stylized and will not be ideal perfect shapes in real-life embodiments.

One example of a high intensity acoustic wave generator operating in a way like this is shown and explained in connection with FIGS. 8 and 9.

Figure 2:
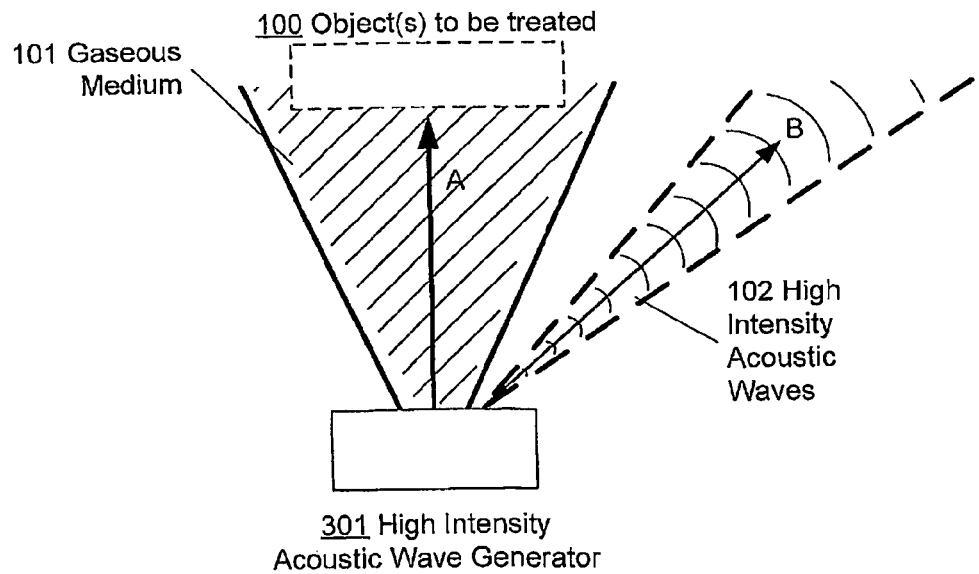
FIG. 2 schematically illustrates another example of a high intensity acoustic wave generator.

FIG. 2 schematically illustrates another example of a high intensity acoustic wave generator. Shown is an example of a jet stream high intensity acoustic wave generator (301) that generates high intensity acoustic waves (102) using a gaseous medium (101). The gaseous medium (101) exits this particular device (301) in a general direction schematically indicated by arrow (A) in a cone-like shape, as represented by the hatched area, towards one or more objects and/or particles (100) to be treated or affected by the gaseous medium (101).

The generated high intensity acoustic waves propagate (102) In a general direction as schematically indicated by arrows (B) that is different than the general direction of the gaseous medium (A) due to the working principle of the acoustic wave generator (301).

One example of a high intensity acoustic wave generator operating in a way like this is shown and explained in connection with FIG. 10. This design generates high intensity acoustic waves in a substantial cone-like line (seen from above), whereas the design of FIG. 1 generates waves in a substantially circular way.

The difference between the general directions of the high intensity acoustic waves (B) and the general direction of the gaseous medium (A) causes a loss in efficiency as explained above.

Figure 3:
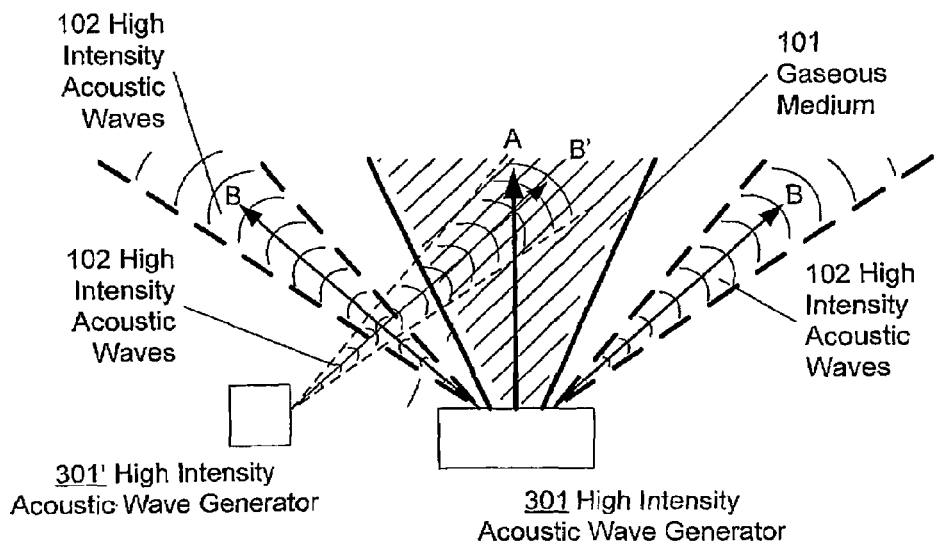
FIG. 3 schematically illustrates an embodiment of high intensity acoustic wave generators where a first and a second generator are shown.

FIG. 3 schematically illustrates an embodiment of high intensity acoustic wave generators where a first and a second generator are shown. Shown are a first high intensity acoustic wave generator (301) and an additional or second high intensity acoustic wave generator (301'). The first high intensity acoustic wave generator (301) may be of the type described in connection with FIG. 1 and may e.g. be a classical, stem-jet, disk-jet, Laval-nozzle etc. Hartmann generator, a Levavasseur whistle, etc.

The high intensity acoustic waves (102) generated by the first generator (301) propagate in a general direction as schematically indicated by arrows (B) that is different than the general direction of the gaseous medium (A) from the first generator (301) due to the design of the acoustic wave generator (301) as explained earlier.

The second high intensity acoustic wave generator (301') may be any kind of high intensity acoustic generator, either a generator like the first generator (301) or another type e.g. without using a gaseous medium. The high intensity acoustic waves (102) generated by the second generator (301') propagate in a general direction as schematically indicated by arrow (B').

The first (301) and the second acoustic wave generator (301') are located in relation to each other so that at least a part of the generated high intensity acoustic waves (102) from the second acoustic wave generator (301') has a general direction (B') that is directed towards at least a part of the gaseous medium (101) from the first acoustic wave generator (301).

By directing high intensity acoustic waves generated by the second generator (301') directly towards the gaseous medium (101) from the first generator (301), energy is supplied in as a direct way as possible so that it directly influences the gaseous medium (101) thereby increasing the efficiency of the gaseous medium if treating one or more objects or particles in given area, treatment zone or the like (not shown). The high intensity acoustic waves should be in contact with the gaseous medium e.g. before or at substantially the same time as the gaseous medium reaches a treatment or affection zone or region of an object to be affected or treated. This avoids or reduces the need for conventional reflectors or a specific design of the device comprising the acoustic wave generator that otherwise would be needed to direct or deflect the generated high intensity acoustic waves towards the gaseous medium. It should be noted that reflectors or the specific design may still be used to direct high intensity acoustic waves generated by the first generator so that it also influences the gaseous medium supplying additional energy (although not as efficiently as the high intensity acoustic waves from the second generator).

According to one aspect, as explained in connection with FIG. 12, a particular efficient reflector may be used to supply the energy from the acoustic waves to the gaseous medium (created by the same generator) thereby increasing the efficiency of the gaseous medium if treating one or more objects or particles in given area, treatment zone or the like (not shown). This avoids the need for an additional acoustic generator (for direct energy supplying purposes to the gaseous medium of the first generator although a second and additional generators still may be present). For this particular embodiment, such a reflector could be located on the right next to the generator (301).

In the figure, the shown sizes, directions, etc. of the cones (101; 102) do not relate to any specific physical properties like acoustic wave intensity, etc. but merely serve for illustrational purposes. The intensities of the two generators (301; 301') may be equal or different (with either one being greater than the other). Furthermore, as noted in connection with FIG. 1 the shapes, sizes, and directions may vary from application to application.

The specific location of the second generator (301') may also vary and may e.g. be placed above or higher than, e.g. facing, the first generator (301); as long as the acoustic waves (102) of the second generator (301') directly influences the gaseous medium (101) of the first generator (301).

Figure 11:
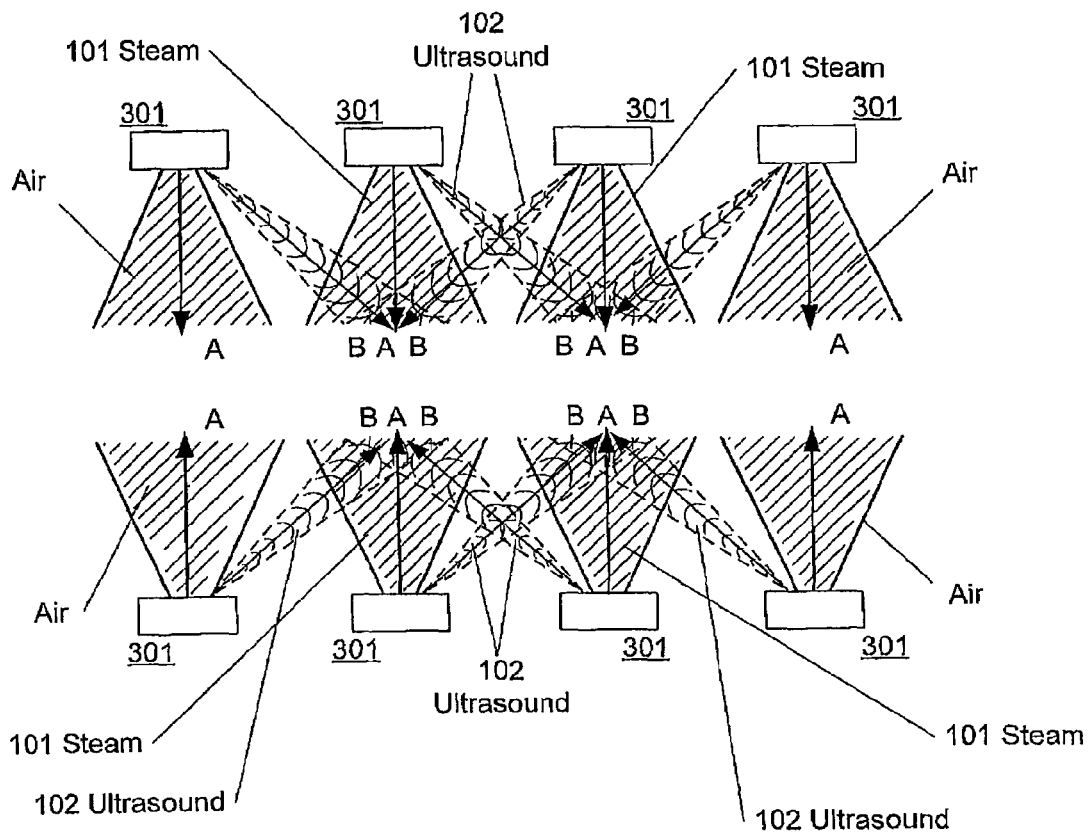
FIG. 11 schematically illustrates an arrangement comprising a number of high intensity acoustic wave generators.

Although this particular example shows two generators it is to be understood that a given arrangement may comprises additional generators, e.g. In a setup as shown in FIG. 11.

The gaseous medium (102) may e.g. be steam, super-heated steam, air, a mix of steam or super-heated steam and air or in general any gaseous medium, e.g. used in disinfection of food items, binder application and/or drying of an airborne flow if fibres, etc. If a mix of steam or super-heated steam and air is used it has the advantage that the air prevents the steam from condensing too easily.

Alternatively, the gaseous medium of said first and/or said second generator is selected from the group of ozone, ethylene oxide and its mixtures with hydrochlorofluorocarbons, alkali elements, hydroxides vapors, fluorine and chlorine as well as the gases based on them, like $CHF_3$, $CF_4$, $SF_6$, $BCl_3$, and their mixtures with pure oxygen and chlorine, e.g. used in microelectronics for so-called 'dry etching' of Si wafers and other materials.

The gaseous medium (102) may e.g. also be gaseous mediums suitable for enhancing a catalytic process reacting on a solid object like a catalyst or another type of object. Furthermore, the gaseous medium (102) may e.g. be a cold gas or coolant if the process is cooling an object or a hot gas if the process is heating an object. The application of high intensity acoustic waves will also reduce or eliminate the presence of a laminar sub-layer around a solid object to be treated.

Figure 4:
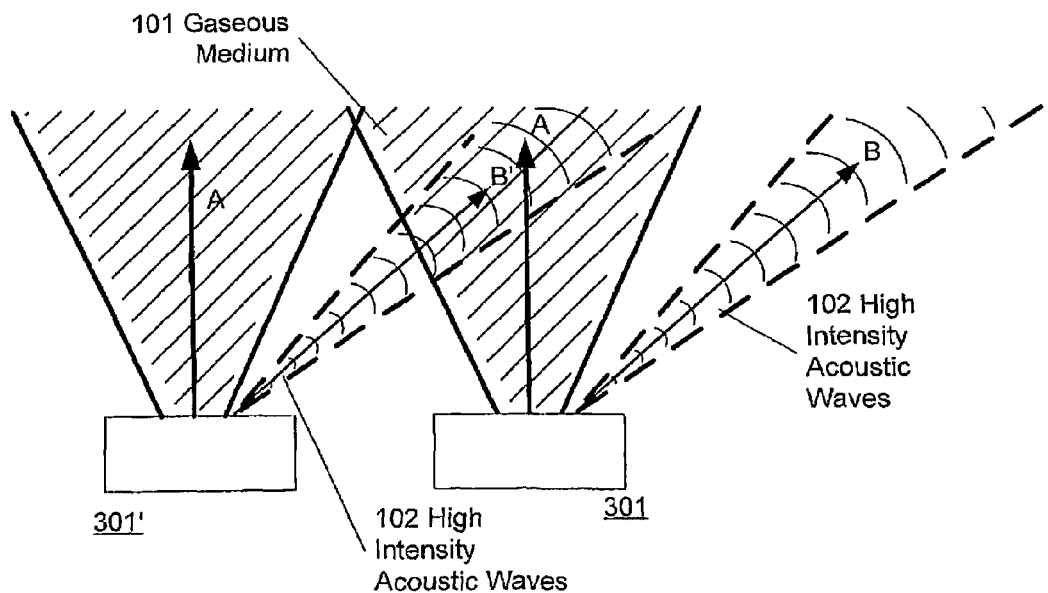
FIG. 4 schematically illustrates an alternative embodiment of high intensity acoustic wave generators where a first and a second generator are shown.

FIG. 4 schematically illustrates an alternative embodiment of high intensity acoustic wave generators where a first and a second generator are shown. Shown are a first high intensity acoustic wave generator (301) and an additional or second high intensity acoustic wave generator (301'). This setup corresponds to the one in FIG. 3 with the exceptions that the first generator (301) is of a different type, i.e. the first generator in this setup supplies high intensity acoustic waves in a substantial line (as in FIG. 10) or in a substantial point instead of in a substantial circular way as the first generator in the setup of FIG. 3 and that the first (301) and second generator (301') is of the same type.

The same effects and advantages are obtained as explained in connection with FIG. 3.

In the following, a sharp distinction is not made between a first and a second generator as one generator merely has to affect the gaseous medium of another generator. Correspondingly, references B' and 301' will not be used in the following figures.

Figure 5:
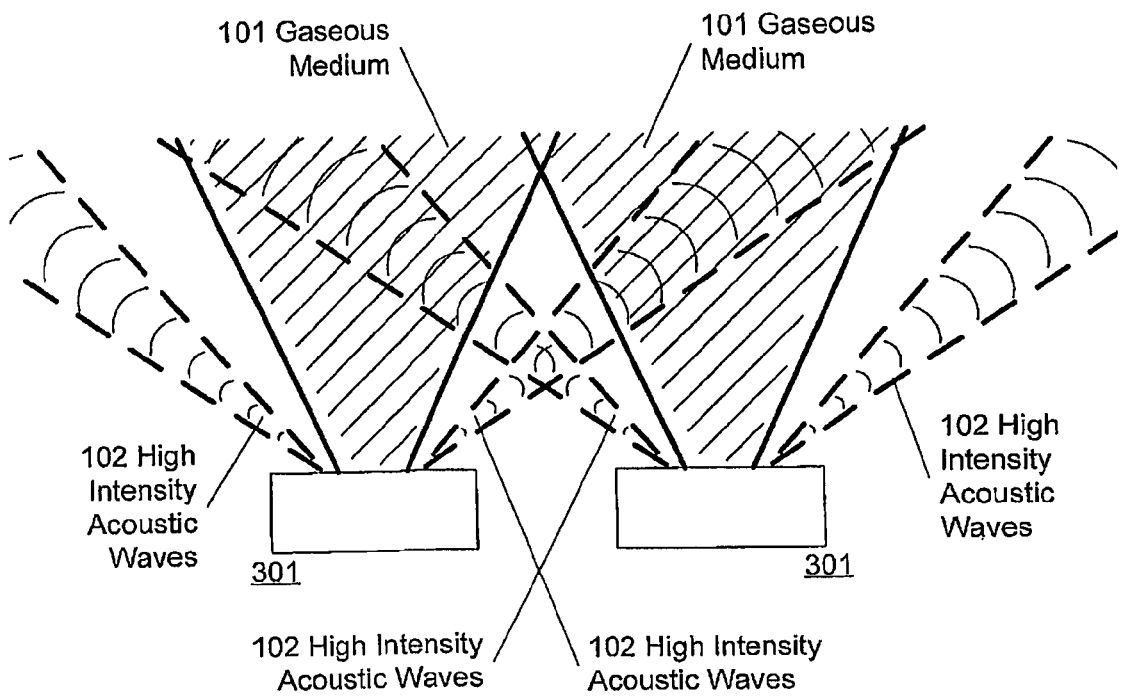
FIG. 5 schematically illustrates yet another embodiment of high intensity acoustic wave generators where a first and a second generator are shown.

FIG. 5 schematically Illustrates yet another embodiment of high intensity acoustic wave generators where a first and a second generator are shown. Shown are a first and a second high intensity acoustic wave generator (301), each corresponding to the one shown in FIG. 1 or the first generator of FIG. 3. In this particular setup, each generator uses a gaseous medium (101), where the gaseous medium (101) of each generator (301) is influenced directly by high intensity acoustic waves being generated by the other generator (301).

According to one aspect, as explained in connection with FIG. 12, a particular efficient reflector may be used to supply the energy from the acoustic waves to the gaseous medium (created by the same generator) thereby increasing the efficiency of the gaseous medium if treating one or more objects or particles in given area, treatment zone or the like (not shown). This avoids the need for an additional acoustic generator (for direct energy supplying purposes of the first generator although a second and additional generators still may be present). For this particular embodiment, two such reflectors could be used. One located on each side of the generators (301), i.e. one on the outmost left and one on the outmost right on this specific figure.

Figure 6:
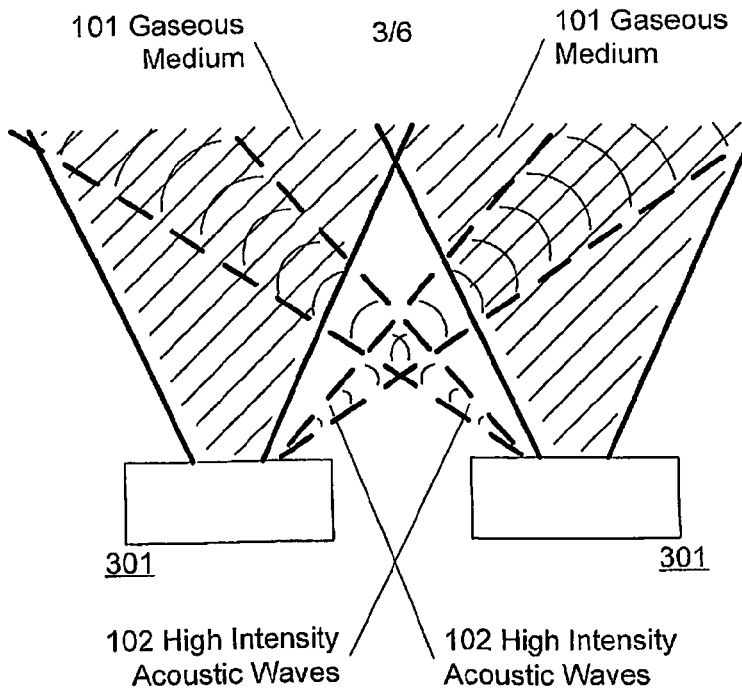
FIG. 6 schematically illustrates a further embodiment of high intensity, acoustic wave generators.

FIG. 6 schematically illustrates a further embodiment of high intensity acoustic wave generators. Shown are two generators (301) each corresponding to the generator e.g. shown in FIGS. 2 and 3. This embodiment differs from the embodiment of FIG. 3 in that one of the generators (301) is turned or mirrored towards the other so that the generated high intensity acoustic waves (102) of one generator (301) directly influences the gaseous medium (101) of the other generator and vice verse. This gives a very compact and efficient setup as the gaseous medium of each generator is enhanced by the high intensity acoustic waves of another generator using a total of only two generators.

As described elsewhere for other setups and/or generators the location of the generators in relation to each other may vary. One example is e.g. where the two generators are facing each other displaced or shifted but where the high Intensity acoustic waves still directly Influences the gaseous medium of the other generator (e.g. the embodiment of FIG. 4 where e.g. the right generator is rotated 180° and moved up).

Figure 7:
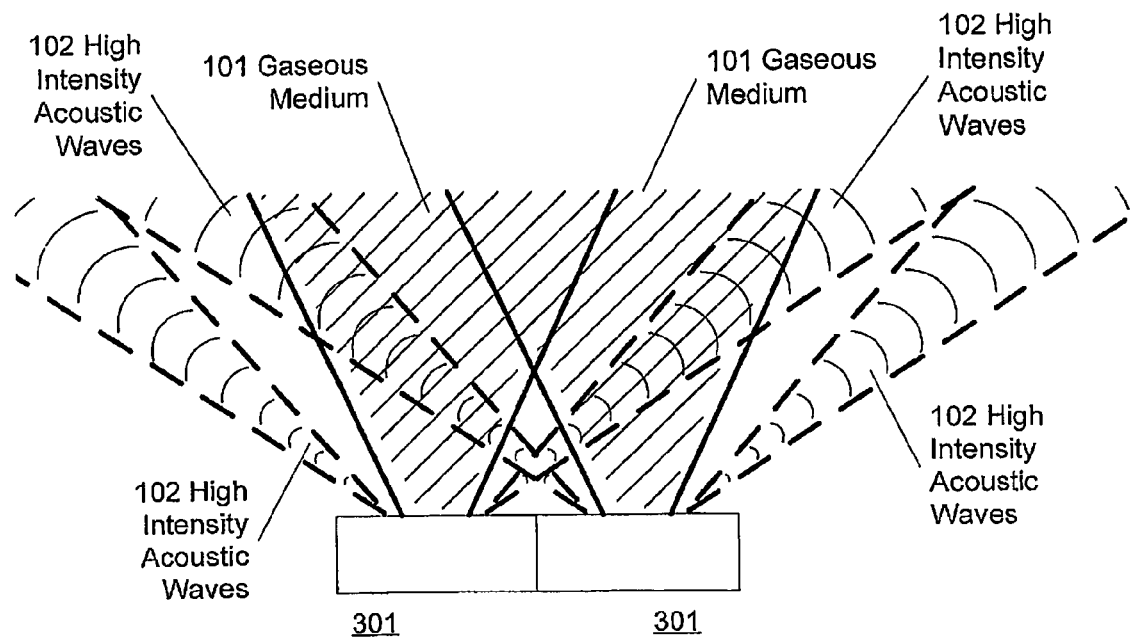
FIG. 7 schematically illustrates an alternative of the embodiment of FIG. 5.

FIG. 7 schematically illustrates an alternative of the embodiment of FIG. 5. The shown generators (301) correspond to the ones shown in FIG. 5 with the difference that they are placed adjacent to each other instead of spaced apart.

FIG. 8 schematically illustrates an embodiment of a high intensity acoustic wave generator in the form of a disk-shaped disk jet (i.e. a disk-jet Hartmann ultrasound generator). Shown is an embodiment of a high intensity ultrasound generator (301), in this example a so-called disk-jet. The generator (301) comprises a generally annular outer part (305) and a generally cylindrical inner part (306), in which an annular cavity (304) is recessed. Through an annular gas passage (303) gases may be diffused to the annular opening (302) from which it may be conveyed to the cavity (304). The outer part (305) may be adjustable in relation to the inner part (306), e.g. by providing a thread or another adjusting device (not shown) in the bottom of the outer part (305), which further may comprise fastening means (not shown) for locking the outer part (305) in relation to the inner part (306), when the desired interval there between has been obtained. Such an ultrasound device may generate a frequency of about 22 kHz at a gas pressure of 4 atmospheres. The molecules of the gas are thus able to migrate up to 33 μm about 22,000 times per second at a velocity of 4.5 m/s. These values are merely included to give an idea of the size and proportions of the ultrasound device and by no means limit of the shown embodiment.

FIG. 9 is a sectional view along the diameter of the high intensity acoustic wave generator (301) In FIG. 8 illustrating the shape of an opening (302), a gas passage (303) and a cavity (304) more clearly. As mentioned in connection with FIG. 8 the opening (302) is generally annular. The gas passage (303) and the opening (302) are defined by the substantially annular outer part (305) and the substantially cylindrical inner part (306) arranged therein. The gas jet discharged from the opening (302) hits the substantially circumferential cavity (304) formed in the inner part (306), and then exits the high intensity ultrasound generator (301). As previously mentioned the outer part (305) defines the exterior of the gas passage (303) and is further bevelled at an angle of about 30° along the outer surface of its inner circumference forming the opening of the high intensity ultrasound generator, wherefrom the gas jet may expand when diffused. Jointly with a corresponding beveling of about 60° on the inner surface of the inner circumference, the above beveling forms an acute-angled circumferential edge defining the opening (302) externally. The inner part (306) has a beveling of about 45° in its outer circumference facing the opening and internally defining the opening (302). The outer part (305) may be adjusted; in relation to the Inner part (306), whereby the pressure of the gas jet hitting the cavity (304) may be adjusted. The top of the inner part (306), in which the cavity (304) is recessed, is also bevelled at an angle of about 45° to allow the oscillating gas jet to expand at the opening of the high intensity ultrasound generator.

Figure 10:
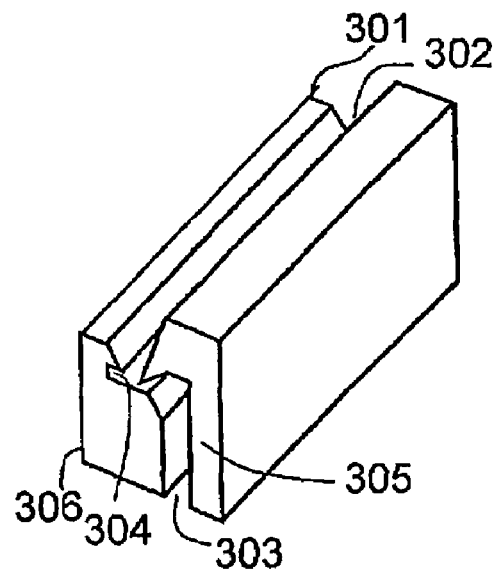
FIG. 10 schematically illustrates another embodiment of a high intensity acoustic generator in form of an elongated body.

FIG. 10 schematically illustrates another embodiment of a high intensity acoustic wave generator in form of an elongated body. Shown is a high intensity acoustic wave generator (301) comprising an elongated substantially rail-shaped body, where the body is functionally equivalent with the embodiments shown in FIGS. 8 and 9. In this embodiment the outer part comprises one rail-shaped portion (305), which jointly with a rail-shaped other part (306) forms an ultrasound device (301). A gas passage (303) is provided between the rail-shaped portion (305) and the rail-shaped other part (306). The gas passage has an opening (302) conveying emitted gas from the gas passage (303) to a cavity (304) provided in the rail-shaped other part (306). One advantage of this embodiment is that a rail-shaped body is able to coat a far larger surface area than a circular body. Another advantage of this embodiment is that the high intensity acoustic wave generator may be made in an extruding process, whereby the cost of materials is reduced. The generated high intensity acoustic waves will be generated e.g. like shown in FIGS. 2, 4 and 6.

FIG. 11 schematically illustrates an arrangement comprising a number of high intensity acoustic wave generators. Shown are eight high intensity acoustic wave generators (301) arranged with four generators (301) aligned substantially on a line and facing the other four generators (301) aligned in a similar manner. The two generators (301) in the middle on each side corresponds in one embodiment to the generator shown in FIGS. 2, 4, 6 and 10, i.e. a generator (301) that only generates acoustic waves in one direction. The two generators (301) in the middle on each side is, in this embodiment, located so that the generated acoustic waves (102) generated by one of the two middle generators (301) propagate toward the other generator (301) of the two middle generators (301) at a given angle and vice-versa, i.e. the acoustic waves (102) of one of the middle generators (301) of a specific side is directed towards the gaseous medium (101) of the other middle generator of the specific side and vice versa (i.e. corresponding to the embodiment of FIG. 6). In this embodiment, the gaseous medium (101) of the two middle generators for a specific side is, as an example, steam or super-heated steam, e.g. comprising a mix of air to keep the steam from condensing as easily.

An additional generator (301) is located on each side of the two middle generators of each side. In this embodiment, these additional generators (301) are also of the types shown in FIGS. 2, 4, 6 and 10. In this embodiment, the gaseous medium (101) of these additional generators (301) is air. The additional generators (301) are located so that their generated acoustic waves (102) directly influence the steam or super-heated steam of the middle generators (301). The gaseous medium (101) of these additional generators (301) is not directly influenced by any high intensity acoustic waves from the generators.

This particular arrangement provides a very efficient treatment zone with very concentrated steam or super-heated steam efficiently receiving a large amount of energy thereby enhancing the process or treatment by the steam or super-heated steam, e.g. such as disinfecting food items, etc. The treatment zone receives high intensity acoustic waves from all eight generators (four on each side) and receives steam or super-heated steam (e.g. including a mix of air) from four generators (the two middle ones on each side). The air coming from the four additional generators (301) provides a sort of a barrier for the steam thereby 'encapsulating' or keeping to a certain extent the steam or super-heated steam in the treatment zone due to differences in velocity and density and temperature of the gases. If these four additional generators (301) were not present steam or super-heated steam would leave or disperse from the treatment zone more readily.

The distance between the two sides, each side comprising four generators (301) may very according to the needed setup. For example, the two sides shown in FIG. 11 may be placed closer together so the cones touch each other.

In alternative embodiments, one or more of the generators are of the type shown e.g. in FIG. 1. In another alternative embodiment, the four additional generators are not present which still will have a very efficient treatment zone but which will not keep the steam in the zone as efficiently as the embodiment comprising the four additional generators. In one embodiment, the arrangement only comprises two additional generators e.g. located to the left or alternatively to the right of the middle generators or alternatively on the upper side or alternatively on the lower side or combinations thereof.

Figure 12:
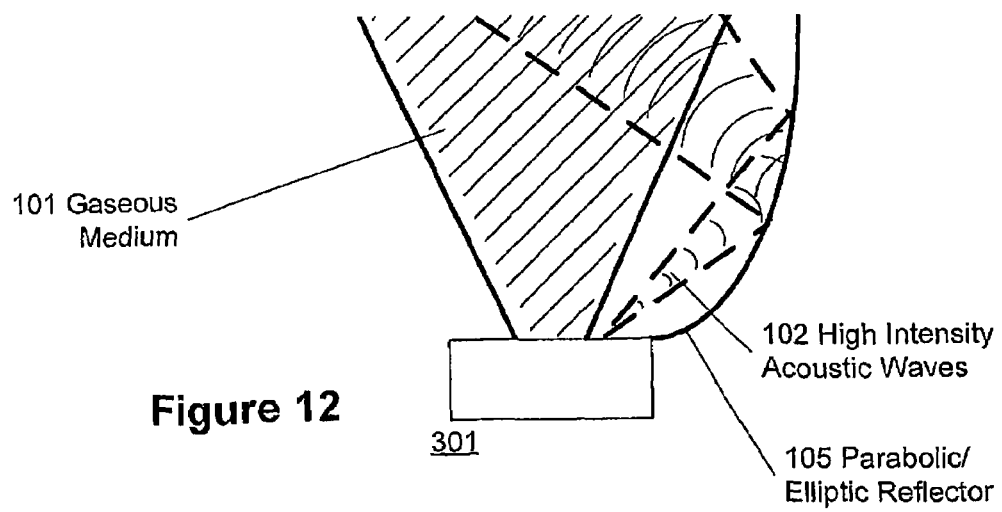
FIG. 12 schematically illustrates an embodiment with an efficient reflector.

FIG. 12 schematically illustrates an embodiment with an efficient reflector. Illustrated are an acoustic wave generator (301) that corresponds to the one(s) described earlier where the generator (301) generates high intensity acoustic waves (102) using a gaseous medium (101). The gaseous medium (101) exits this particular device (301) in a general direction in a cone-like shape, as represented by the hatched area, towards one or more objects and/or particles (not shown) to be treated or affected by the gaseous medium (101).

The generated high intensity acoustic waves propagate (102) In a general direction that is different than the general direction of the gaseous medium due to the working principle of the acoustic wave generator (301). However, in this particular embodiment, a reflector (105) is provided that reflects (or deflects) the generated high intensity acoustic waves towards the gaseous medium (101).e.g. towards one or more objects and/or particles (not shown) to be treated or affected by the gaseous medium (101).

In this embodiment, a reflector (105) is provided instead of a second high intensity acoustic wave generator (for purposes of influencing the gaseous medium of the first generator) where the reflector reflects the high intensity acoustic waves (102) generated by the first acoustic wave generator (301) towards at least a part of the gaseous medium (101) after exit from said first acoustic wave generator (301) wherein the reflector (105) has a generally parabolic or elliptical shape.

In this way, a very efficient and focused direction of the generated acoustic waves towards the gaseous medium (generated by the same generator) is provided without the need for a second acoustic wave generator for influencing the gaseous medium of the given generator directly (although one or more additional acoustic wave generators still may be provided for other purposes like providing additional gas/steam, additional acoustic waves, additional influencing the gaseous medium of the first generator, etc.) so that acoustic waves or ultrasound may be brought in contact with the steam or gaseous medium at an appropriate reaction or treatment zone with sufficient or optimal energy.

Hereby, one or more particular efficient reflectors may be used to supply the energy from the acoustic waves to the gaseous medium (of the same generator) thereby increasing the efficiency of the gaseous medium if treating one or more objects or particles in given area, treatment zone or the like (not shown). This avoids or reduces the need for an additional acoustic generator (for direct energy supplying purposes).

Having a generally parabolic or elliptic shape enables a very efficient focusing of the acoustic waves, i.e. near/around the focus point of the parabola or ellipsoid.

By generally parabolic shape is to be understood that the reflector has a cross section through a centerline going in the lengthwise direction (i.e. the direction between the closed end and the open end of the reflector) of the reflector that substantially or generally is parabolic.

By generally elliptic shape is to be understood that the reflector has a cross section through a centerline going in the lengthwise direction (i.e. the direction between the closed end and the open end of the reflector) of the reflector that substantially or generally is elliptic.

The use of such an efficient parabolic or elliptic reflector may be combined with various other embodiments described above where applicable.

It is to be understood that the reflector can be located differently than shown in relation to the generator, e.g. the lower part of the parabola may be located under the generator.

Furthermore, two reflectors may also be provided. E.g. one on each side of two generators (like shown in FIG. 5 or 7) enclosing both generators.

Another example of an arrangement could be two generators as shown in FIG. 12 located in such a way that the reflectors will be adjacent to each other.

Another example could be two reflectors one each side of a generator providing two directions of the acoustic waves (e.g. like the one shown in FIG. 1).

The specific shape of the reflector(s) may be modified to some extent to accommodate for acoustic wave source is not a true or ideal punctual source.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The invention claimed is:

1. A method of enhancing application of high intensity acoustic waves, wherein the method comprises:

generating high intensity acoustic waves by a first acoustic wave generator using a gaseous medium so that the gaseous medium, after exit from the acoustic wave generator, forms a steam beam extending from the first acoustic wave generator in a first general direction and the acoustic waves form an ultrasound beam extending from the first acoustic wave generator in a second general direction that is different from the first general direction, generating high intensity acoustic waves by a second acoustic wave generator, wherein the first and second acoustic wave generators are located in relation to each other so that at least a part of the generated high intensity acoustic waves, being generated by said second acoustic wave generator, is directed towards at least a part of the gaseous medium after exit from said first acoustic wave generator.

2. The method according to claim 1, wherein the gaseous medium is steam or super-heated steam or super-heated steam mixed with air.

3. The method according to claim 1, wherein said high intensity acoustic waves generated by at least one high intensity acoustic wave generator are ultrasound.

4. The method according to claim 1, wherein the generated high intensity acoustic waves being generated by said second acoustic wave generator have a sound intensity selected from the group of:
at least 120 dB,
at least 140 dB,
approximately 120 dB to approximately 160 dB,
approximately 120 dB to approximately 140 dB, and
approximately 140 dB to approximately 160 dB.

5. The method according to claim 1, wherein said second acoustic wave generator uses a gaseous medium to generate acoustic waves.

6. The method according to claim 1, wherein said first and said second acoustic wave generator is of the same type.

7. The method according to claim 1, wherein the gaseous medium of said first acoustic wave generator is steam or super-heated steam or super-heated steam mixed with air and the gaseous medium of said second acoustic wave generator is air or wherein the gaseous medium of said first and/or said second generator is selected from the group of ozone, ethylene oxide and its mixtures with hydrochlorofluorocarbons, alkali elements, hydroxides vapors, fluorine and chlorine as well as the gases based on them and their mixtures with pure oxygen and chlorine, a gaseous medium suitable for enhancing a catalytic process reacting on a solid object, a cold gas or coolant, a hot gas and mixtures thereof.

8. The method according to claim 7, wherein the gaseous medium of said first and/or said second generator is a gas selected from the group of $CHF_3$, $CF_4$, $SF_6$, $BCl_3$.

9. The method according to claim 1, wherein the method comprises generating high intensity acoustic waves by a first group of four acoustic wave generators, where the four acoustic wave generators are located in relation to each other so that at least a part of the generated high intensity acoustic waves of each of the four wave generators is directed towards the gaseous medium of one of the other wave generators.

10. The method according to claim 9, wherein the method comprises
    generating high intensity acoustic waves by four additional acoustic wave generators where at least a part of the generated high intensity acoustic waves is directed towards the gaseous medium of said first group of four acoustic wave generators, where the four additional acoustic wave generators uses air to generate the high intensity acoustic waves where the air after exit from the additional acoustic wave generators hinders the gaseous medium of the first group of four acoustic wave generators from dispersing from a predetermined area.

11. The method according to claim 1, wherein said first and/or said second high intensity acoustic wave generator comprises:
    an outer part and an inner part defining a passage,
    an opening, and
    a cavity provided in the inner part
where said first and/or said second high intensity acoustic wave generator is adapted to receive a pressurized gaseous medium and pass the pressurized gaseous medium to said opening, from which the pressurized gaseous medium is discharged in a jet towards the cavity.

12. The method according to claim 1, wherein two first reflectors are provided instead of a second high intensity acoustic wave generator where the reflectors reflect the high intensity acoustic waves generated by the first acoustic wave generator towards at least a part of the gaseous medium after exit from said first acoustic wave generator and wherein an additional high intensity acoustic wave generator and two additional reflectors are provided where the additional reflectors are adapted to reflect the high intensity acoustic waves generated by the additional acoustic wave generator towards at least a part of the gaseous medium after exit from said additional acoustic wave generator and wherein said reflectors have a generally parabolic or elliptic shape and wherein said first and said additional high intensity acoustic wave generator are located in such a way that their respective gaseous medium after exit has general direction towards to other high intensity acoustic wave generator.

13. The method according to claim 1, wherein the generated high intensity acoustic waves being generated by said second acoustic wave generator have a sound intensity of approximately 160 dB or more.

\* \* \* \* \*